US012743641B2

(12) United States Patent
Zuo et al.

(10) Patent No.: US 12,743,641 B2
(45) Date of Patent: Sep. 22, 2026

(54) ABNORMALITY DETECTION BASED ON CAUSAL GRAPHS REPRESENTING CAUSAL RELATIONSHIPS OF ABNORMALITIES

(71) Applicant: R&B TECHNOLOGY HOLDING CO. LTD., George Town (KY)

(72) Inventors: Mingming Zuo, Shanghai (CN); Gang Wu, Shanghai (CN); Charles Ho Yuen Wong, Hong Kong (CN)

(73) Assignee: R&B TECHNOLOGY HOLDING CO. LTD., George Town (KY)

( * ) Notice: Subject to any disclaimer, the term of this patent is extended or adjusted under 35 U.S.C. 154(b) by 1382 days.

(21) Appl. No.: 17/168,947

(22) Filed: Feb. 5, 2021

(65) Prior Publication Data

US 2022/0253733 A1 Aug. 11, 2022

(51) Int. Cl.

| | |
|---|---|
| ***G06N 5/045*** | (2023.01) |
| ***G06F 17/15*** | (2006.01) |
| ***G06F 18/214*** | (2023.01) |
| ***G06N 5/022*** | (2023.01) |

(52) U.S. Cl.

CPC ........... *G06N 5/045* (2013.01); *G06F 17/153* (2013.01); *G06F 18/214* (2023.01); *G06N 5/022* (2013.01)

(58) Field of Classification Search

None

See application file for complete search history.

(56) References Cited

U.S. PATENT DOCUMENTS

| | | | | |
|---|---|---|---|---|
| 7,353,214 | B2 | 4/2008 | Yamanishi et al. | |
| 8,140,301 | B2 | 3/2012 | Abe et al. | |
| 9,483,049 | B2 | 11/2016 | Maeda et al. | |
| 11,568,281 | B2 * | 1/2023 | Isahagian | G06N 20/00 |
| 2017/0235626 | A1 | 8/2017 | Zhang et al. | |
| 2018/0314835 | A1 | 11/2018 | Dodson et al. | |
| 2018/0314965 | A1 | 11/2018 | Dodson et al. | |
| 2020/0097997 | A1 | 3/2020 | Li | |
| 2020/0099707 | A1 * | 3/2020 | Abbaszadeh | G06N 20/00 |

(Continued)

FOREIGN PATENT DOCUMENTS

| | | |
|---|---|---|
| CN | 108596229 | 9/2018 |
| CN | 111723973 | 9/2020 |

OTHER PUBLICATIONS

"The Concise Encyclopedia of Statistics," (Dodge), Springer Reference, pp. 102-104. (Year: 2008).*

(Continued)

*Primary Examiner* — Michael J Huntley
*Assistant Examiner* — Paul J Breene
(74) *Attorney, Agent, or Firm* — NIXON & VANDERHYE, P.C.

(57) ABSTRACT

An example method for abnormality detection based on causal graphs representing causal relationships of abnormalities includes detecting an abnormality in a test data set and generating a counterfactual data set for the test data set. The method further includes determining a quantitative feature dependence between the test data set and the counterfactual data set and determining a causal relationship of the abnormality based on the quantitative feature dependence. The method also includes generating a causal graph that represents the causal relationship of the abnormality. The method may also implement an action to mitigate the abnormality based on the causal graph.

18 Claims, 8 Drawing Sheets

(56) References Cited

U.S. PATENT DOCUMENTS

2021/0056209 A1* 2/2021 Fox ....................... G06F 21/563
2022/0245508 A1* 8/2022 Liao ....................... G06N 20/00

OTHER PUBLICATIONS

"The Concise Encyclopedia of Statistics," (Dodge), Springer Reference, p. 348. (Year: 2008).*
"Additive white Gaussian noise," Wikipedia (Year: 2020).*
"The Concise Encyclopedia of Statistics," Dodge, Springer Reference, pp. 102-104, 348. (Year: 2008).*
"A survey on Casual Discovery Methods for I.I.D. and Time Series Data," arXiv, Hasan et al; Hasan (Year: 2024).*
"Feature Dependencies: Everything You Need To Know When Assessing Feature Dependencies," Alooba Team (Year: 2019).*
"Review of Causal Discovery Methods Based on Graphical Models," Frontiers in Genetics, Glymour et al; Glymour. (Year: 2019).*
Generative Adversarial Networks, Goodfellow et al., Goodfellow, 2017 (Year: 2017).*
A Survey on GANs for Anomaly Detection, Di Mattia, arXiv, 2019. (Year: 2019).*
International Search Report issued in PCT/2022/074863, dated Apr. 26, 2022, 5 pages.

* cited by examiner

ABNORMALITY DETECTION BASED ON CAUSAL GRAPHS REPRESENTING CAUSAL RELATIONSHIPS OF ABNORMALITIES

FIELD OF THE DISCLOSURE

The present disclosure relates to methods and devices for detection, diagnosis/prognosis, and mitigation of anomalies (also referred to as abnormalities herein).

BACKGROUND

There are a considerable number of conventional machine-learning-based abnormality detection methods that are generally used to detect abnormalities in data sets with high dimensions.

SUMMARY

An abnormality detection method and device that are able to determine dependence and causal relationship for an abnormality in a data set are provided. In one embodiment, a method includes detecting an abnormality in a test data set, generating a counterfactual data set for the test data set, determining a quantitative feature dependence between the test data set and the counterfactual data set, determining a causal relationship of the abnormality based on the quantitative feature dependence, and generating a causal graph that represents the causal relationship of the abnormality. In one embodiment, an action may be implemented, based on the causal graph, to mitigate an occurrence of the abnormality.

In one embodiment, an abnormality detection device includes a processor and a non-transitory computer-readable medium storing instructions which, when executed by the processor, cause the processor to perform operations. The operations include detecting an abnormality in a test data set, generating a counterfactual data set for the test data set, determining a quantitative feature dependence between the test data set and the counterfactual data set, determining a causal relationship of the abnormality based on the quantitative feature dependence, and generating a causal graph that represents the causal relationship of the abnormality. In one embodiment, the operations further include implementing an action, based on the causal graph, to mitigate an occurrence of the abnormality.

In one embodiment, an abnormality detection device comprises a processor and a plurality of non-transitory modules that store instructions, which, when executed by the processor, cause the processor to perform operations. The plurality of modules comprises a knowledge processing module for enabling a user to input information in a first form and for converting the information in the first form to a second form, a minimum correlated feature subset detection module for determining a minimum correlated feature subset; an abnormality detection module for detecting an abnormality of test data sets and for generating counterfactual data sets via an abnormality detection model; a dependence interpretation module for training a feature dependence interpretation model of dependence among features and for generating quantitative feature dependence for test data and counterfactual data sets; a causality analyzation module for discovering causal relationships of generated feature dependence via causality discovery algorithms; and a causal-graph-based interpretation generation module for generating a causal graph on which the quantitative feature dependence and the causal relationships are represented to interpret the abnormality process.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses abnormality detection based on causal graphs that represent causal relationships of abnormalities and mitigation of an occurrence of an abnormality. As discussed above, there are a considerable number of conventional machine-learning-based abnormality detection methods that are generally used to detect an abnormality of data sets with high dimensions. Despite conventional machine-learning-based abnormality detection methods indicating abnormality scores or other indices, conventional methods fail to infer dependence of multiple abnormal features or interpret causalities and provide indications thereof. Accordingly, in the absence of such an interpretation of detected abnormalities and identification of corresponding sources of the detected abnormalities, conventional abnormality detection methods are not able to assist in the mitigation of an occurrence of an abnormality.

The present disclosure describes abnormality detection based on causal graphs that represent causal relationships of abnormalities. The disclosed abnormality detection may be utilized to mitigate an occurrence of an abnormality caused by a plurality of abnormal features and/or causalities.

Figure 1:
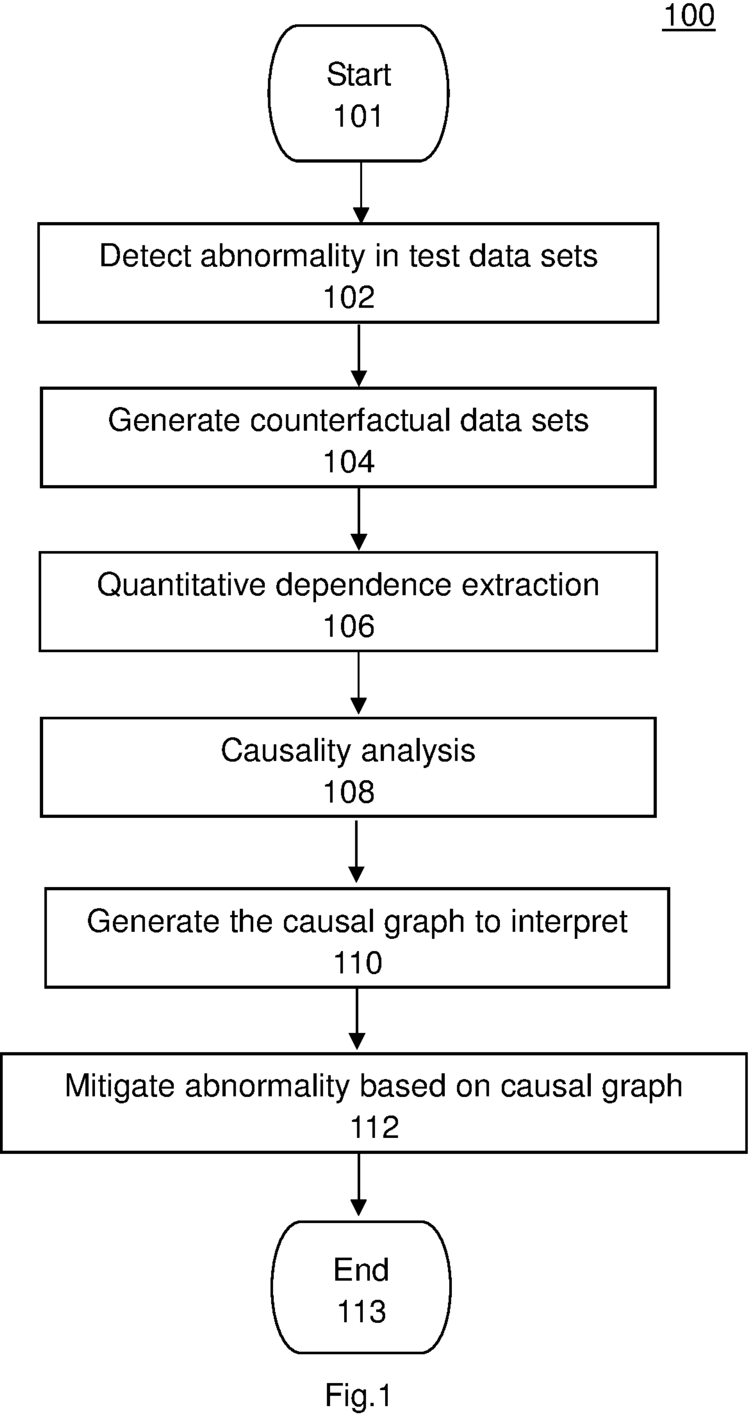
FIG. 1 illustrates a flowchart of an example method for abnormality detection based on causal graphs that represent causal relationships of abnormalities and for mitigation of an occurrence of an abnormality.
Figure 2:
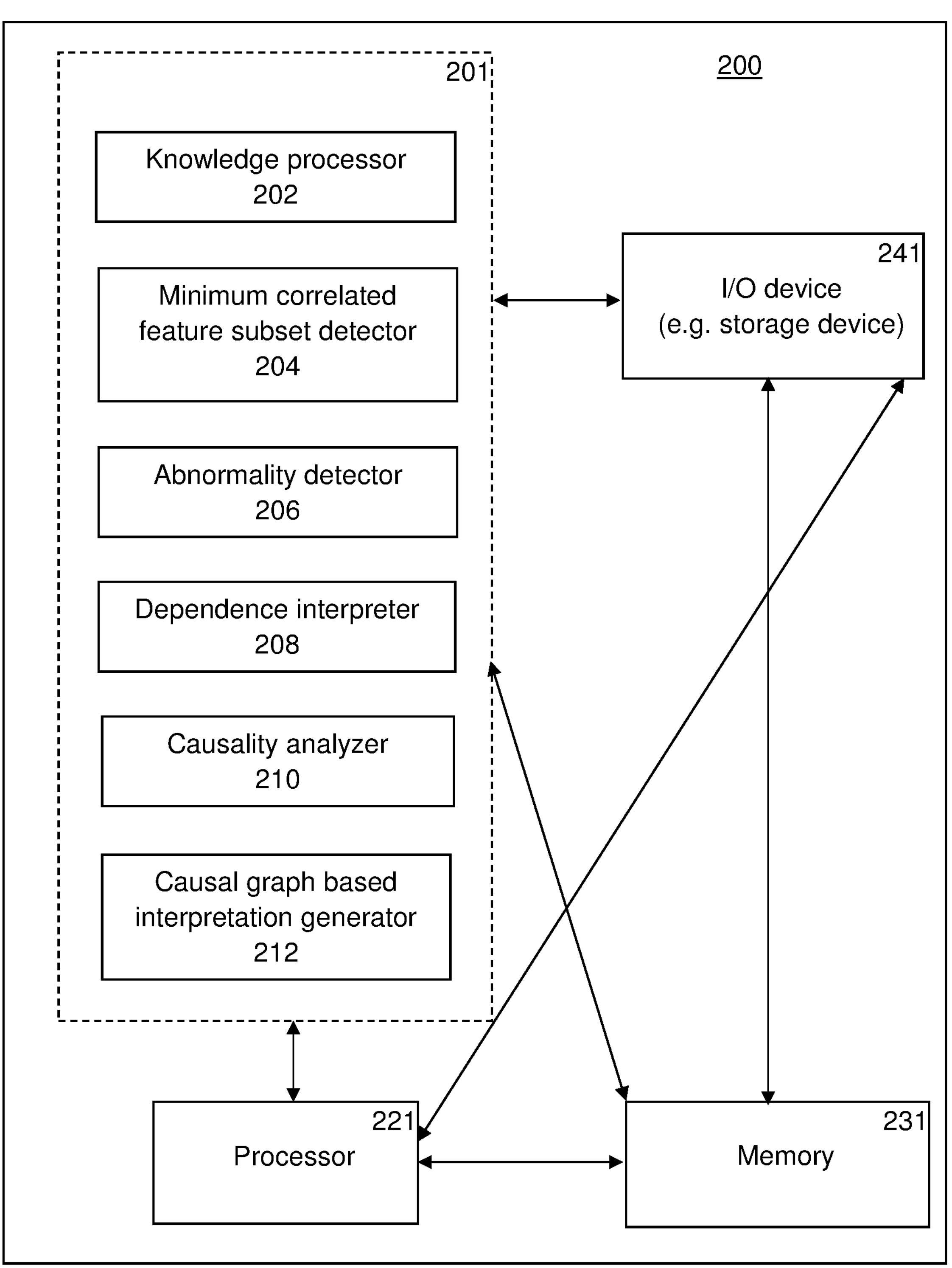
FIG. 2 illustrates high-level block diagram of a computer suitable for use in performing the operations described herein.

To aid in understanding the present disclosure, FIG. 1 depicts an example method of abnormality detection based on causal graphs that represent causal relationships of abnormalities. In particular, in one embodiment, the method 100 detects an abnormality in a test data set, determines a causal relationship of the abnormality based on a quantitative feature dependence between the test data set and a counterfactual data set, generates a causal graph that represents the causal relationship of the abnormality, and implements an action to mitigate an occurrence of the abnormality based on the causal graph. In one embodiment, the method 100 may be performed by a dedicated computing device as illustrated in FIG. 2 and discussed below.

The method 100 of FIG. 1 begins in operation 101. In operation 102, the method detects an abnormality in a test data set.

In operation 104, the method generates a plurality of counterfactual data sets for the test data set.

In operation 106, the method determines a quantitative feature dependence between the test data set and the plurality of counterfactual data sets.

In operation 108, the method determines a causal relationship of the abnormality based on the quantitative feature dependence.

In operation 110, the method generates a causal graph that represents the causal relationship of the abnormality.

In operation 112, the method implements an action, based on the causal graph, to mitigate an occurrence of the abnormality.

In operation 113, the method ends.

FIG. 2 depicts a high-level block diagram of a computing device suitable for use in performing the functions described herein. As depicted in FIG. 2, the system 200 comprises a module 201 for abnormality detection based on causal graphs representing causal relationships of abnormalities, one or more hardware processor elements 221 (e.g., a central processing unit (CPU), a microprocessor, or a multi-core processor), a memory 231 (e.g., random access memory (RAM) and/or read only memory (ROM)), and various input/output devices 241 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)).

In the example of FIG. 2, the module 201 for abnormality detection based on causal graphs representing causal relationships of abnormalities includes a knowledge processing module 202, a minimum correlated feature subset detection module 204, an abnormality detection module 206, a dependence interpretation module 208; a causality analyzation module 210, and a causal-graph-based interpretation generation module 212.

The knowledge processing module 202 is configured to enable a user to input information in certain forms and to convert the information that is input into one or more other forms that are recognizable by other modules. For example, information in a first form may be input and converted to a second form. The knowledge processing module can accept at least, but not limited to, the following information:

a) feature labelling; and b) feature dependence.

A feature labelling is used to denote a specific one of the features of a data set. Each feature labelling also indicates a weight for the specific feature. In one embodiment, the smaller the weight of the feature labelling of a specific feature, the more impact the specific feature, when found in the test and training data sets, will have with respect to anomaly detection relative to another feature labelling having a larger weight. For example, example labels and weights of feature labelling are illustrated in Table 1.

TABLE 1

Feature labels and weights

| Label | Weight | Explanation |
|---|---|---|
| Fb | 4.0 | Control loop feedback |
| Lmt | 1.0 | Value limit |
| Sn | 4.0 | Sensor reading |
| Sp | 2.0 | Control loop setpoint |
| Misc | 8.0 | Other features |

In particular, Table 1 indicates that label Fb is utilized to identify a control loop feedback and is assigned a weight of 4.0. Although example Table 1 includes information related to five feature labels, it should be noted that Table 1 may include information related to any number of feature labels that is greater than one (1). In addition, it should be noted that a weight associated with a feature labelling can be set to value other than those illustrated in Table 1.

The provided abnormality detection is able to determine the dependence and causal relationship for an abnormality in a data set based on monitored features of the data set. For example, Table 2 illustrates an example of feature labelling for a data set comprising nine features.

TABLE 2

Feature labels and weights for features of a data set

| Point | Label | Weight |
|---|---|---|
| AirFlow | Fb | 4.0 |
| MaxFlow | Lmt | 1.0 |
| MinFlow | Lmt | 1.0 |
| MinFlowCalc | Fb | 4.0 |
| RmTemp | Sn | 4.0 |
| RmTempSP | Sp | 2.0 |
| SADamper | Fb | 4.0 |
| IsCold | Misc | 8.0 |
| IsHot | Misc | 8.0 |

In particular, Table 2 indicates that the feature AirFlow is a control loop feedback that is assigned a weight of 4.0. Although example Table 2 includes information related to nine features, it should be noted that Table 2 may include information related to any number of features that is greater than one (1). In addition, it should be noted that any feature labelling may be utilized to describe feature.

Feature dependence refers to knowledge such as data monotonic constraints, causal relationships, and the like, which are typically definable by the user.

The minimum correlated feature subset detection module 204 is configured to determine a minimum correlated feature subset that may be utilized to mitigate negative impact outnumbered strong correlated features exert on the generalization performance of the device 200. When the correlation between features is greater than a correlation threshold, the features are said to be strongly correlated features. Strong correlated features are said to be outnumbered when the number of strong correlated features is greater than a threshold.

Figure 3:
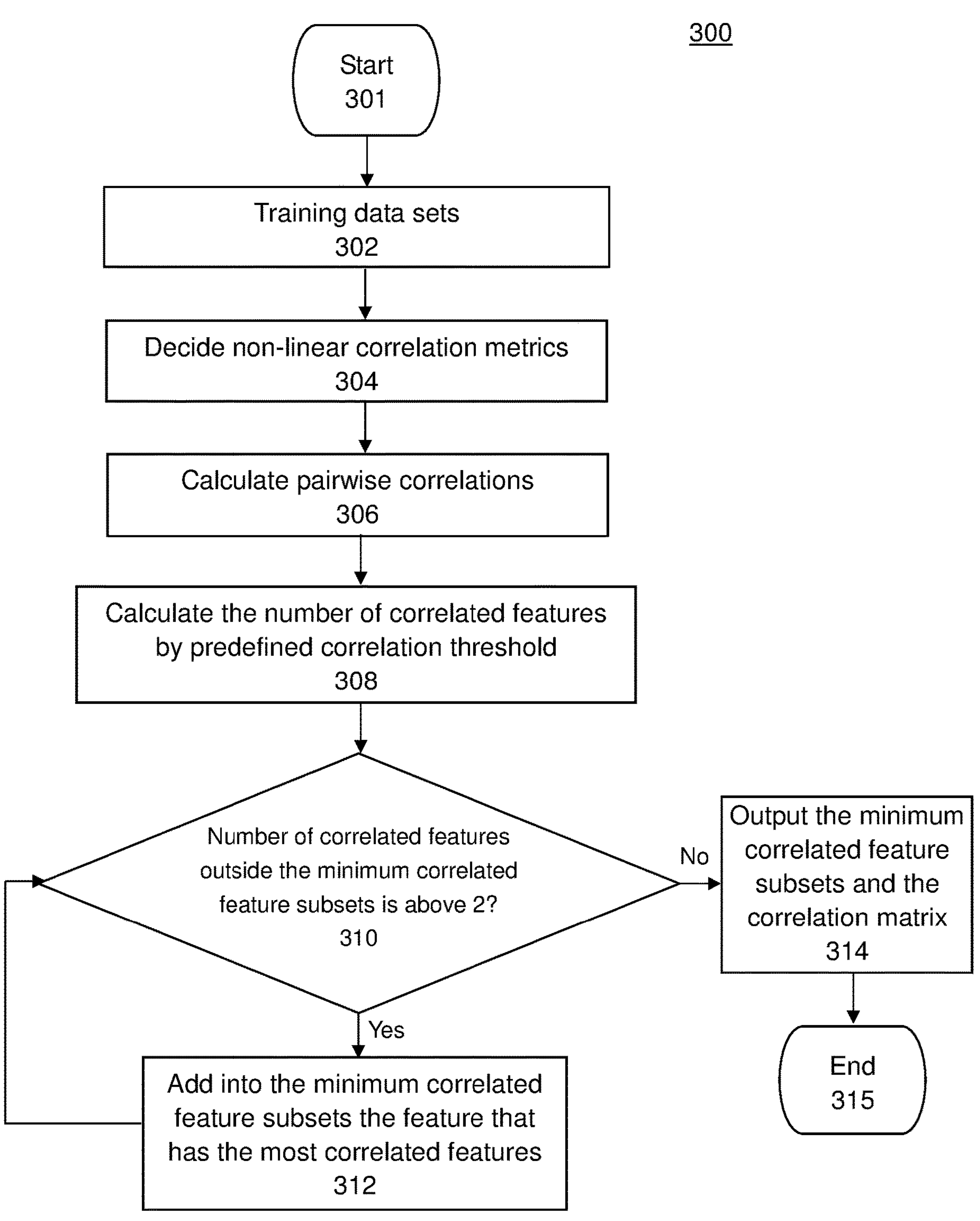
FIG. 3 illustrates a flowchart of an example method for determining a minimum correlated feature subset.

As noted above, the minimum correlated feature subset detection module is configured to utilize a correlation threshold to evaluate the correlation strength of features of a training data set. If the correlation strength of features is greater than the correlation threshold, the correlated features are identified as having strong correlation and one or multiple correlated features are extracted to a subset. The extracted subset shall be a minimum subset such that the strength of correlated features of the training data set, when the minimum subset is eliminated from the training data set, are below the correlation threshold. The subset of correlated features that remain after elimination of the minimum subset from the training subset and whose correlation is below the correlation threshold is called the maximum weak correlation subset. FIG. 3, further described below, illustrates a flowchart of an example method for determining a minimum correlated feature subset in accordance with the minimum correlated feature subset detection module.

Figure 4:
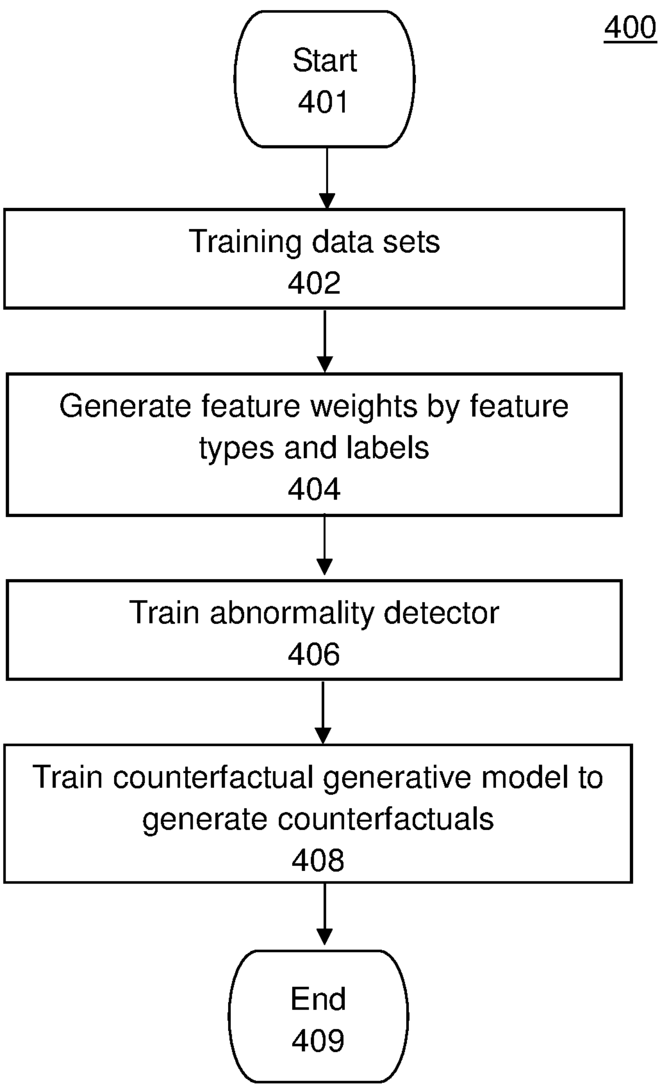
FIG. 4 illustrates a flowchart of an example method to train an abnormality detection model.
Figure 5:
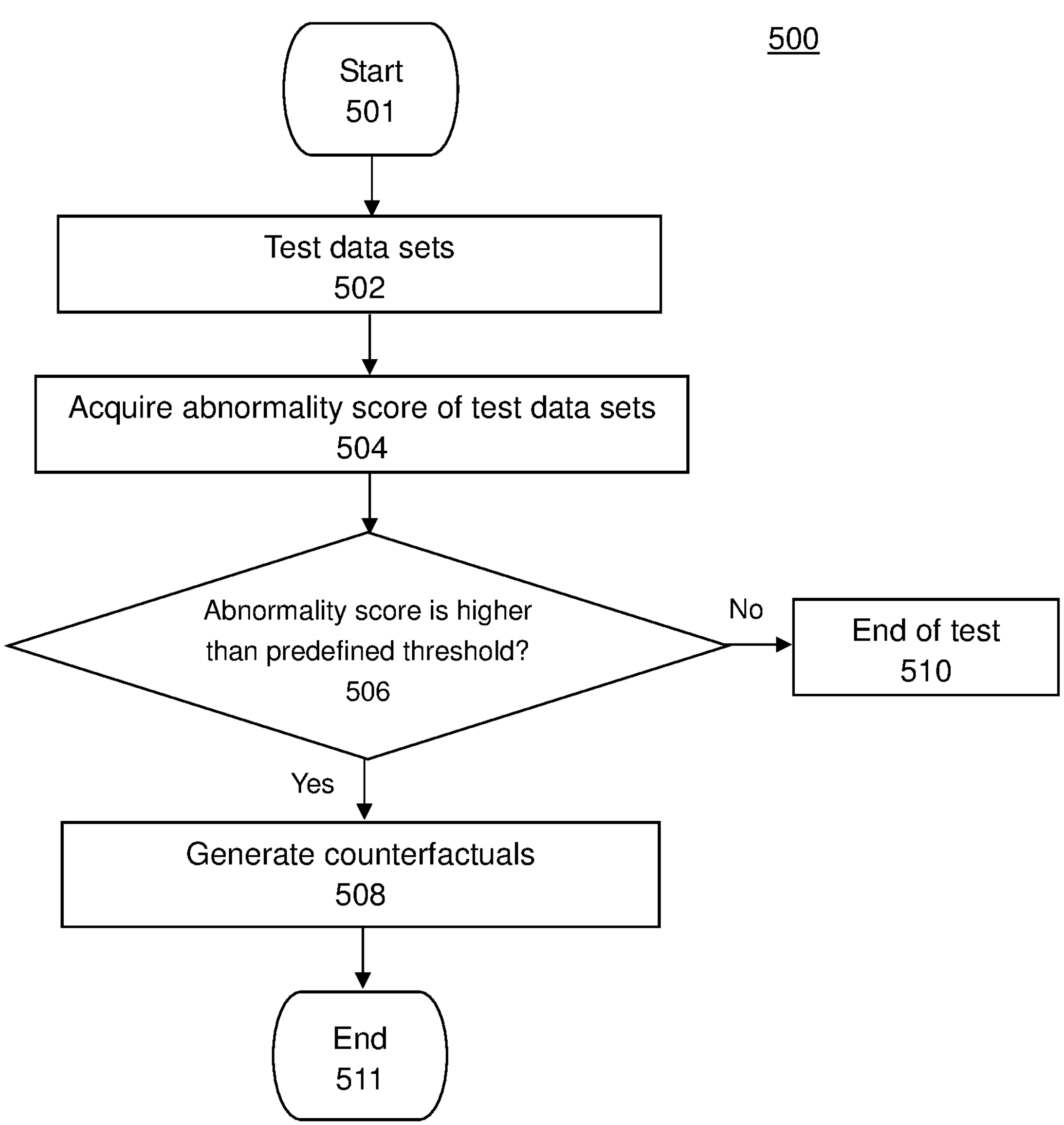
FIG. 5 illustrates a flowchart of an example method to detect an abnormality and generate counterfactual data sets.

The abnormality detection module 206 is configured to detect an abnormality of test data sets and generate counterfactual data sets via an abnormality detection model. FIG. 4, further described below, illustrates a flowchart of an example method for training an abnormality detection model that may be utilized in accordance with the abnormality detection module. FIG. 5, further described below, illustrates a flowchart of an example method to detect an abnormality performed in accordance with the abnormality detection module.

Figure 6:
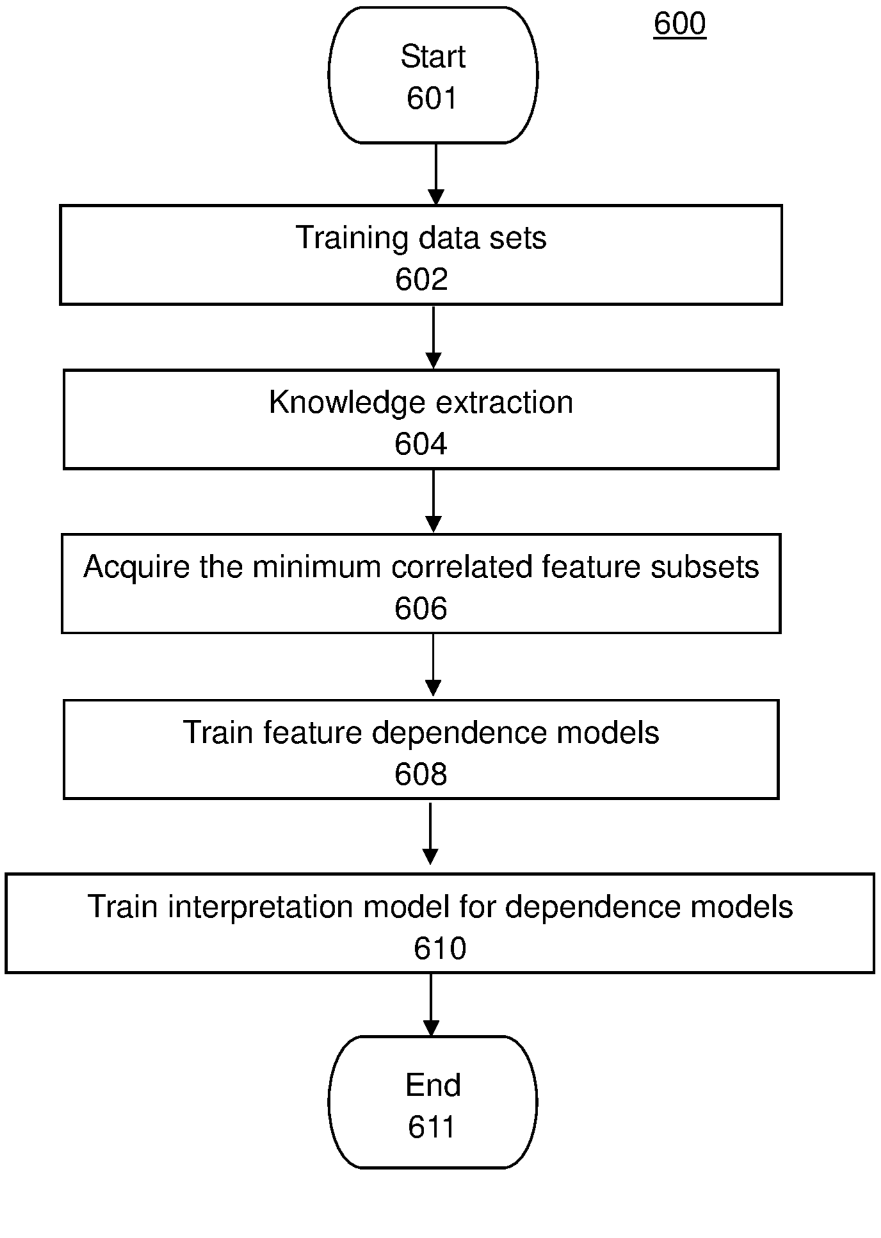
FIG. 6 illustrates a flowchart of an example method to train a feature dependence interpretation model.
Figure 7:
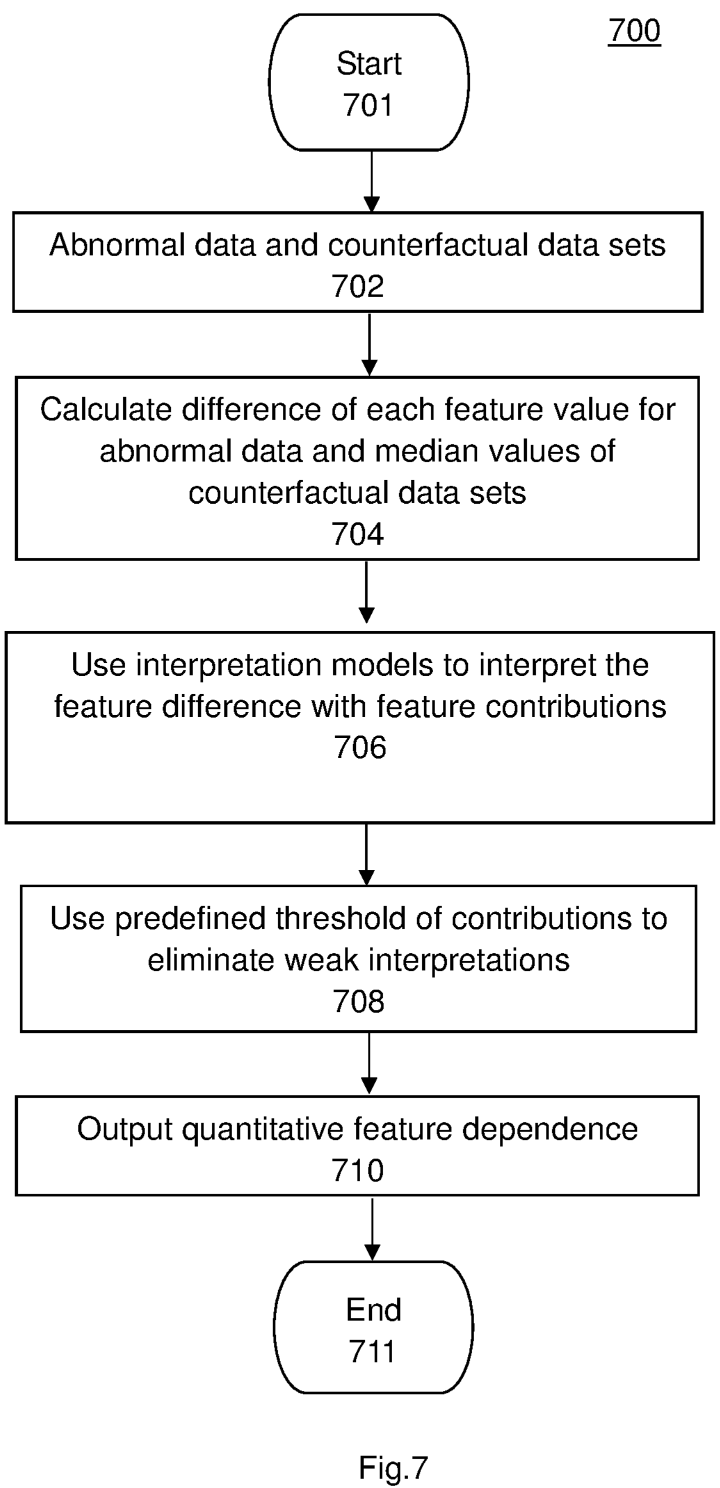
FIG. 7 illustrates a flowchart of an example method to determine a quantitative feature dependence for an abnormality.

The dependence interpretation module 208 is configured to determine dependence among features and generate a quantitative feature dependence for test data and counterfactual data sets. Once a feature dependence interpretation model learns feature dependence via training, the feature dependence interpretation model will be able to describe the feature dependence in a quantitative way and provide the quantitative feature dependence as input for causality analysis. FIG. 6, further described below, illustrates a flowchart of an example method to train a feature dependence interpretation model for use in accordance with the dependence interpretation module. FIG. 7, further described below, illustrates a flowchart of an example method to determine a quantitative feature dependence for each abnormality in accordance with the dependence interpretation module.

Figure 8:
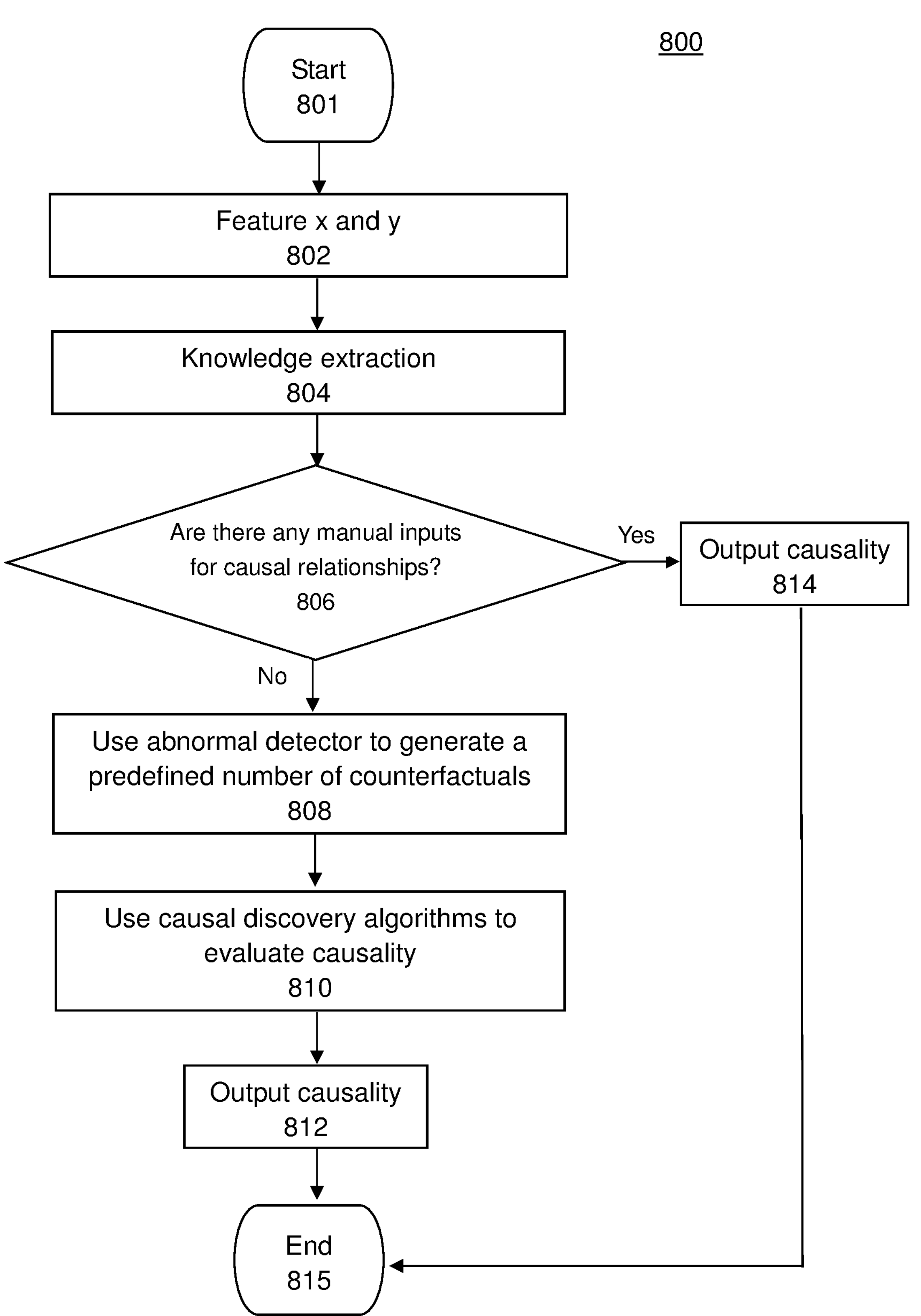
FIG. 8 illustrates a flowchart of an example method to perform causality analysis of two (2) features.

The causality analyzation module 210 is configured to determine causal relationships of generated feature dependence via causality discovery algorithms. FIG. 8, further described below, illustrates a flowchart of an example method to perform causality analysis of two (2) features in accordance with the causality analyzation module.

The causal-graph-based interpretation generation module 212 is configured to generate a causal graph in which the quantitative feature dependence and causal relationships that interpret an abnormality are represented. In one embodiment, the module 201 for abnormality detection based on causal graphs representing causal relationships of abnormalities may also include an action module that implements, based on the causal graph, an action to mitigate an occurrence of an abnormality. For example, such an action may control one or more of a limit, a control loop setpoint, and the like, that are associated with a feature.

Although only one processor element is shown, it should be noted that the computing device may employ a plurality of processor elements. Furthermore, although only one computing device is shown in FIG. 2, if the methods disclosed herein are implemented in a distributed or parallel manner for a particular illustrative example, i.e., the operations of the methods or the entirety of method may be implemented across multiple or parallel computing devices, then the computing device of this figure is intended to represent each of those multiple or parallel computing devices.

Further, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the methods discussed herein can be used to configure a hardware processor to perform the steps, functions and/or operations of disclosed methods FIGS. 1, 3, 4, 5, 6, 7, and 8. In one embodiment, instructions and data for the modules or processes for detecting abnormality based on causal graphs that represent causal relationships of abnormalities (e.g., a software program comprising computer-executable instructions) can be loaded into memory 231 and executed by hardware processor element 221 to implement the steps, functions or operations as discussed in connection with the illustrative methods described herein. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the modules for detecting abnormality based on causal graphs that represent causal relationships of abnormalities (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server. Additionally, the use of the term "non-transitory" is only intended to avoid claiming a signal per se, but it is not intended to mean that the computer-readable medium can never be altered or changed, e.g., due to a natural degradation of the computer-readable media over time.

FIG. 3 illustrates a flowchart of an example method for determining a minimum correlated feature subset that may be performed in accordance with a minimum correlated feature subset detection module. The method 300 of FIG. 3 begins in operation 301. In operation 302, the method obtains training data sets.

In operation 304, the method determines which correlation metric that is able to evaluate nonlinear correlations is to be utilized by the method. In operation 306, the method applies the correlation metric to pairwise features of the training data sets in order to calculate correlation scores. In operation 308, the method accumulates the number of correlated features whose correlation scores are over a correlation threshold (e.g., the number of pairwise features having a correlation score greater than the correlation metric, as determined according to the correlation metric).

Operations 310 and 312 enable the method 300 to iterate the extraction of features with high correlation scores into the minimum correlated feature subset until pairwise correlation scores of the rest of the correlated features of a training set of the training data sets that are not extracted all become below the correlation threshold. In particular, operation 310 determines whether the number of correlated features outside the minimum correlated feature subset is greater than two (2). In particular, when the number of correlated features outside the minimum correlated feature subset is greater than two (2), the method proceeds to operation 312. In operation 312, the method adds into the minimum correlated feature subset, the feature that has the most correlated features while removing that feature from the set of correlated features and thereafter returns to operation 310.

Alternatively, when operation 310 determines that the number of correlated features outside the minimum correlated feature subset is not greater than two (2), in operation 314, the method outputs the minimum correlated feature subset and a correlation matrix. Thereafter, in operation 315, the method ends.

FIG. 4 illustrates a flowchart of an example method to train an abnormality detection model that may be utilized in accordance with the abnormality detection module. The method 400 of FIG. 4 begins in operation 401. In operation 402, the method obtains training data sets.

In operation 404, the method utilizes information comprising feature labelling provided via the knowledge processing module or provided by default, to generate feature weights. In operation 406, the method utilizes feature weights and the training data sets to train an abnormality detection model. In operation 408, after data cleansing is provided to the training data set to remove abnormal data, the abnormality detection model is further trained to be a counterfactual generation model configured to generate counterfactual data sets. For example, a counterfactual generation model may comprise a generative model, an interpretation-based model, or an algorithm that is capable of generating counterfactual data sets. In operation 409, the method ends.

FIG. 5 illustrates a flowchart of an example method to detect an abnormality and generate one or more counterfactual data sets in accordance with an abnormality detection module. The method 500 of FIG. 5 begins in operation 501. In operation 502, the method obtains test data sets.

In operation 504, the method acquires an abnormality score for the test data sets using an abnormality detection model that has been trained. In operation 506, the method determines whether the abnormality score is greater than a threshold. In particular, when the abnormality score is greater than the threshold such that an abnormality has been identified, the method proceeds to operation 508. In operation 508, the method adds the test data sets to the abnormality detection model that has been trained to generate counterfactual data sets. The method then proceeds to operation 511. In operation 511, the method ends.

Alternatively, when operation 506 determines that the abnormality score is not greater than the threshold, the method proceeds to operation 510. In operation 510, the method ends the testing for abnormalities. Thereafter, the method ends in operation 511.

FIG. 6 illustrates a flowchart of an example method to train a feature dependence interpretation model that may be utilized in accordance with the dependence interpretation module. The method 600 of FIG. 6 begins in operation 601. In operation 602, the method obtains training data sets.

In operation 604, the method determines, from information that was provided via the knowledge processing module 202 or by default, a portion of the information which is to be used to reinforce generalization performance of the device. In particular, the method searches for available information that was via the knowledge processing module. The reinforcement of generalization performance is achieved by using the available information as constraints when training. For example, available information may be utilized to restrict the monotonicity of target variable to certain independent variable. In operation 606, the method acquires a minimum correlated feature subset detected via the minimum correlated feature subset detection module (204). In operation 608, the method utilizes the minimum correlated feature subset to train a feature dependence interpretation model. Such training serves to mitigate the negative impact outnumbered strong correlated features exert on the generalization performance of the device 200 and may increase the training speed of the feature dependence interpretation model.

In operation 610, based on the trained feature dependence interpretation model, the method utilizes a randomly selected subset of the training data set to further train the feature dependence interpretation model to be able to interpret the feature dependence in a quantitative way. In operation 611, the method ends.

FIG. 7 illustrates a flowchart of an example method to determine a quantitative feature dependence for each abnormality that may be performed in accordance with a dependence interpretation module. The method 700 of FIG. 7 begins in operation 701. In operation 702, the method obtains abnormal data and counterfactual data sets.

In operation 704, the method calculates a difference in numerical value for each feature of abnormal data and median values of counterfactual data sets. In operation 706, after the interpretation models of the feature dependence interpretation model are exercised to generate feature contributions of abnormal data and counterfactual data sets, the method generates feature contributions for each numerical difference of features of the abnormal data of the test data set. Feature contributions may comprise individual contributions of features. Other types of feature contributions, such as feature interaction contributions, may be used alternatively or additionally to evaluate feature dependence.

In operation 708, in order to mitigate the negative impact of noise data, the method utilizes a threshold of contributions to eliminate weak feature dependence interpretations (e.g., those feature contributions for a numerical difference of features of the abnormal data of the test data set that are less than a threshold). In other words, weak feature dependence interpretations are those interpretations that have contributions that are less than a threshold. Each "interpretation" refers to the feature contributions generated for each numerical difference of features. In operation 710, the method transforms effective feature contributions into a table that comprises multiple rows. Effective feature contributions are those feature contributions for a numerical difference of features that are not less than a threshold. In one embodiment, each row of the table comprises elements such as A, B, R, w, each representing an inference that target feature R changes by w due to the joint effect of features A and B. In operation 711, the method ends.

FIG. 8 illustrates a flowchart of an example method to perform causality analysis of two (2) features in accordance with a causality analyzation module. The method 800 of FIG. 8 begins in operation 801. In operation 802, the method obtains the two features, namely feature x and feature y.

In operation 804, the method searches for user-input causal relationships in the information provided via the knowledge processing module. In operation 806, the method determines whether there are any user-input causal relationships input for features x and y. For example, a user may have input a causal relationship for features x and y.

If operation 806 determines that there is not any user-input causal relationships for features x and y, the method proceeds to operation 808 for activation of a process for automatic causality recognition. In particular, in operation 808, the method utilizes the abnormality detection model and abnormal data sets to generate a predefined number of counterfactual data sets. Here, an abnormal data set specifically refers to abnormal data which needs to be interpreted. Further, in operation 810, the method evaluates pairwise causality by running pairwise causality discovery algorithms, such as the additive-noise model (ANM), the information geometric causal inference (IGCI) model, and the like, on the counterfactual data sets. Causality (e.g., a causal relationship) is recognized after the causality analyzation module iterates possible feature pairs of a subset of the elements in a table that quantitatively describes feature dependence.

In operation 812, the method outputs the causality (e.g. causal relationship) and proceeds to operation 815. In operation 815, the method ends.

Alternatively, if operation 806 determines that there is one or more user-input causal relationships for features x and y, the method proceeds to operation 814. At operation 814, the method outputs the available user-input causal relationships and proceeds to operation 815. At operation 815, the method ends.

It should be noted that although not specifically specified, one or more steps, functions or operations of the methods described herein may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in the figures that recite a determining operation or involve a decision do not necessarily require that both branches of the determining operation be practiced. In other words, one of the branches of the determining operation can be deemed as an optional step. In addition, one or more steps, blocks, functions or operations of the above described methods may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. An apparatus comprising:

a processor; and a computer-readable medium storing instructions which, when executed by the processor, cause the processor to perform a first plurality of operations comprising:

detecting an abnormality in a test data set via an abnormality detection model;

generating one or more counterfactual data sets for the test data set;

determining a quantitative feature dependence between the test data set and the one or more counterfactual data sets;

determining a causal relationship of the abnormality based on the quantitative feature dependence via a causality discovery algorithm; and generating a causal graph that represents the causal relationship of the abnormality, wherein the causality discovery algorithm is a pairwise causality discovery algorithm, and the determining of the causal relationship of the abnormality based on the quantitative feature dependence comprises:

generating, via the abnormality detection model and based on the test data set with the abnormality, a predefined number of counterfactual data sets;

evaluating pairwise causality, via the pairwise causality discovery algorithm, to recognize the causality relationship; and outputting the causality relationship, and wherein the abnormality detection model is trained via a second plurality of operations, the second plurality of operations comprising:

generating feature weights based on information comprising feature labelling;

training the abnormality detection model based on the feature weights and training data sets;

removing abnormal data from the training data sets; and training, after the removing the abnormal data from the training data sets, the abnormality detection model to be a counterfactual generation model that is configured to generate the one or more counterfactual data sets, wherein the determining the quantitative feature dependence between the test data set and the one or more counterfactual data sets comprises;

calculating a difference in numerical value for each feature of abnormal data of the test data set and median values of the one or more counterfactual data sets;

generating feature contributions of the abnormal data of the test data set and the one or more counterfactual data sets via a feature dependence interpretation model;

generating feature contributions for each numerical difference of features of the abnormal data of the test data set;

eliminating one or more feature dependence interpretations having feature contributions for a numerical difference of features of the abnormal data of the test data set that are less than a threshold; and transforming the feature contributions for a numerical difference of features of the abnormal data of the test data set that are not less than the threshold into a table that quantitatively describes feature dependence.

2. The apparatus of claim 1, wherein the first plurality of operations further comprises:

implementing an action to mitigate the abnormality based on the causal graph.

3. The apparatus of claim 1, wherein the detecting the abnormality in the test data set comprises:

acquiring an abnormality score for the test data set via the abnormality detection model;

determining the abnormality score is greater than a threshold; and adding, when the abnormality score is greater than the threshold, the test data set to the abnormality detection model, wherein the abnormality detection model is configured to generate the one or more counterfactual data sets.

4. The apparatus of claim 1, wherein the information comprising feature labelling is input by a user or default information.

5. The apparatus of claim 1, wherein the feature labelling comprises: a label of a feature of a data set; and a weight for the feature of a data set.

6. The apparatus of claim 1, wherein the generating the one or more counterfactual data sets for the test data set is performed via the abnormality detection model that is configured to generate the one or more counterfactual data sets.

7. The apparatus of claim 1, wherein the table that quantitatively describes feature dependence comprises one or more rows, wherein each row of the one or more rows represents an inference that a target feature of the features of the abnormal data of the test data set changes by an amount due to a joint effect of one or more pluralities of features of the features of the abnormal data of the test data set.

8. The apparatus of claim 1, wherein the determining the causal relationship of the abnormality based on the quantitative feature dependence further comprises:

obtaining two features of the abnormality in the test data set; and determining that a causal relationship for the two features does not exist in information comprising feature dependence.

9. The apparatus of claim 8, wherein the causality relationship is recognized after iteration of possible feature pairs of a subset of elements in a table that quantitatively describes feature dependence.

10. The apparatus of claim 8, wherein the pairwise causality discovery algorithm comprises an additive-noise model (ANM) or an information geometric causal inference (IGCI) model.

11. The apparatus of claim 1, wherein the determining the causal relationship of the abnormality based on the quantitative feature dependence comprises:

obtaining a plurality of features of the abnormality in the test data set;

determining that a causal relationship for the plurality of features exists in information comprising feature dependence; and outputting the causal relationship.

12. The apparatus of claim 1, wherein the causal relationship represents the quantitative feature dependence of the abnormality.

13. The apparatus of claim 1, wherein the feature dependence interpretation model is trained via a third plurality of operations, the third plurality of operations comprising:

determining, from information comprising feature labelling, a portion of the information to be used to reinforce generalization performance of the apparatus;

acquiring one or more minimum correlated feature subsets;

training the feature dependence interpretation model based on the one or more minimum correlated feature subsets; and training the feature dependence interpretation model based on a randomly selected subset of the training data set.

14. The apparatus of claim 13, wherein the one or more minimum correlated feature subsets are determined via a fourth plurality of operations, the fourth plurality of operations comprising:

determining a correlation metric that is able to evaluate nonlinear correlations;

applying the correlation metric to pairwise features of second training data sets to calculate correlation scores for the pairwise features;

accumulating a numeric value of pairwise features that have a correlation score greater than a correlation threshold based on the correlation scores for the pairwise features; and extracting the pairwise features having a correlation score greater than the correlation threshold into the one or more minimum correlated feature subsets.

15. The apparatus of claim 14, wherein the extracting the pairwise features having a correlation score greater than the correlation threshold into the one or more minimum correlated feature subsets comprises:

iteratively extracting, into the one or more minimum correlated feature subsets, a feature of the pairwise features having a correlation score greater than the correlation threshold that has the greatest number of correlated features, until the numeric value outside the one or more minimum correlated feature subset is not greater than two.

16. The apparatus of claim 14, wherein the fourth plurality of operations further comprises:

outputting at least one of:

the one or more minimum correlated feature subsets; and a correlation matrix.

17. A method comprising:

detecting, by a processor, an abnormality in a test data set via an abnormality detection model;

generating, by the processor, one or more counterfactual data sets for the test data set;

determining, by the processor, a quantitative feature dependence between the test data set and the one or more counterfactual data sets;

determining, by the processor, a causal relationship of the abnormality based on the quantitative feature dependence via a causality discovery algorithm;

generating, by the processor, a causal graph that represents the causal relationship of the abnormality, wherein the causality discovery algorithm is a pairwise causality discovery algorithm, and the determining of the causal relationship of the abnormality based on the quantitative feature dependence comprises:

generating, via the abnormality detection model and based on the test data set with the abnormality, a predefined number of counterfactual data sets;

evaluating pairwise causality, via the pairwise causality discovery algorithm, to recognize the causality relationship; and outputting the causality relationship, and wherein the abnormality detection model is trained via a second plurality of operations, the second plurality of operations comprising:

generating feature weights based on information comprising feature labelling;

training the abnormality detection model based on the feature weights and training data sets;

removing abnormal data from the training data sets; and training, after removing the abnormal data from the training data sets, the abnormality detection model to be a counterfactual generation model that is configured to generate the one or more counterfactual data sets, wherein the determining the quantitative feature dependence between the test data set and the one or more counterfactual data sets comprises:

calculating a difference in numerical value for each feature of abnormal data of the test data set and median values of the one or more counterfactual data sets;

generating feature contributions of the abnormal data of the test data set and the one or more counterfactual data sets via a feature dependence interpretation model;

generating feature contributions for each numerical difference of features of the abnormal data of the test data set;

eliminating one or more feature dependence interpretations having feature contributions for a numerical difference of features of the abnormal data of the test data set that are less than a threshold; and transforming the feature contributions for a numerical difference of features of the abnormal data of the test data set that are not less than the threshold into a table that quantitatively describes feature dependence.

18. A non-transitory computer-readable storage device storing a plurality of instructions which, when executed by a processor, cause the processor to perform operations, the operations comprising:

detecting an abnormality in a test data set via an abnormality detection model;

generating one or more counterfactual data sets for the test data set;

determining a quantitative feature dependence between the test data set and the one or more counterfactual data sets;

determining a causal relationship of the abnormality based on the quantitative feature dependence via a causality discovery algorithm; and generating a causal graph that represents the causal relationship of the abnormality, wherein the causality discovery algorithm is a pairwise causality discovery algorithm, and the determining of the causal relationship of the abnormality based on the quantitative feature dependence comprises:

generating, via the abnormality detection model and based on the test data set with the abnormality, a predefined number of counterfactual data sets;

evaluating pairwise causality, via the pairwise causality discovery algorithm, to recognize the causality relationship; and outputting the causality relationship, and wherein the abnormality detection model is trained via a second plurality of operations, the second plurality of operations comprising:

generating feature weights based on information comprising feature labelling;

training the abnormality detection model based on the feature weights and training data sets;

removing abnormal data from the training data sets; and training, after removing the abnormal data from the training data sets, the abnormality detection model to be a counterfactual generation model that is configured to generate the one or more counterfactual data sets, wherein the determining the quantitative feature dependence between the test data set and the one or more counterfactual data sets comprises;

calculating a difference in numerical value for each feature of abnormal data of the test data set and median values of the one or more counterfactual data sets;

generating feature contributions of the abnormal data of the test data set and the one or more counterfactual data sets via a feature dependence interpretation model;

generating feature contributions for each numerical difference of features of the abnormal data of the test data set, eliminating one or more feature dependence interpretations having feature contributions for a numerical difference of features of the abnormal data of the test data set that are less than a threshold; and transforming the feature contributions for a numerical difference of features of the abnormal data of the test data set that are not less than the threshold into a table that quantitatively describes feature dependence.

* * * * *